May 8, 1962 R. S. JAMIESON 3,034,028
FREQUENCY MODULATION SERVOMECHANISM SYSTEM
Filed Dec. 9, 1958
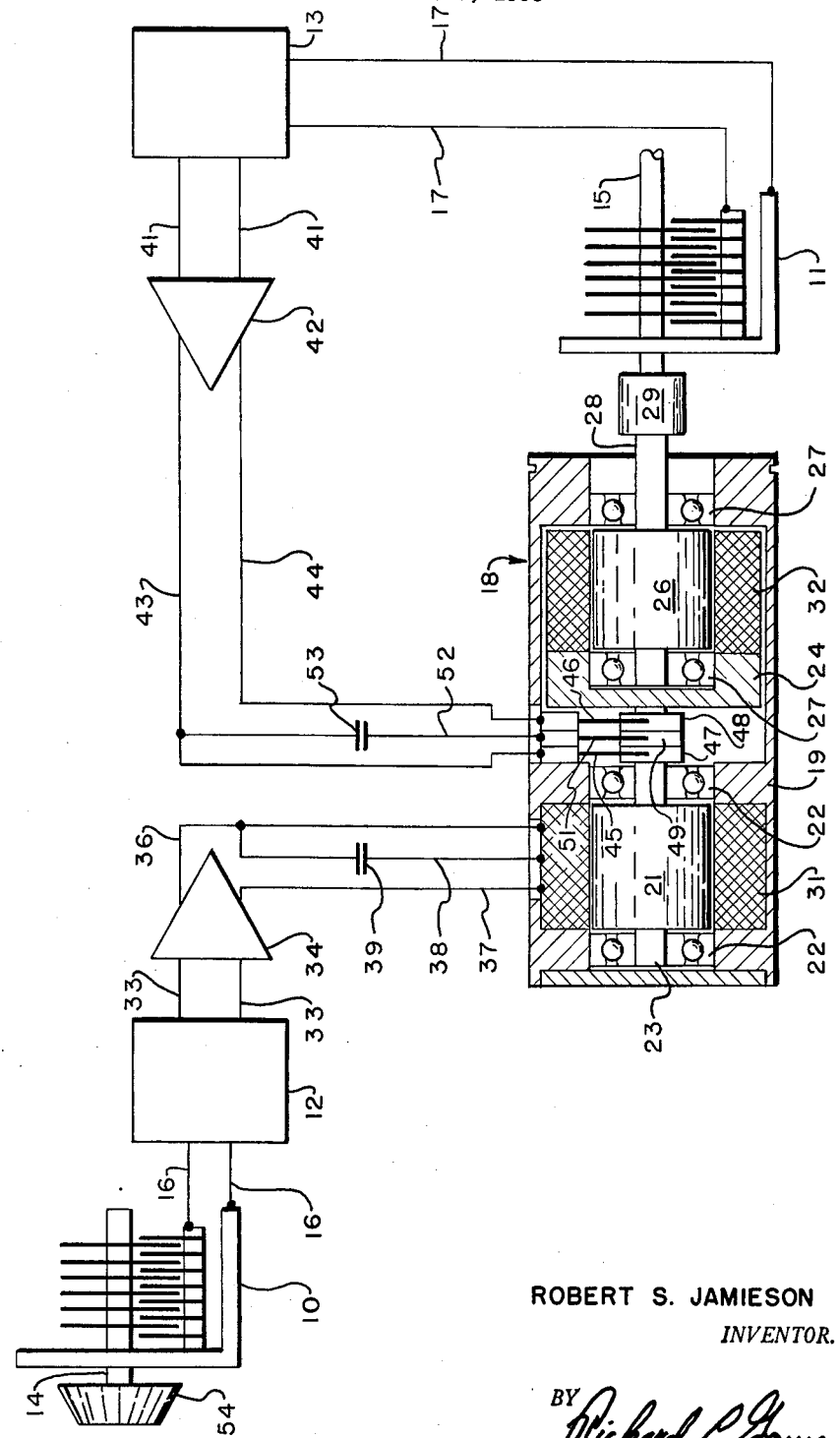
ROBERT S. JAMIESON
*INVENTOR.*
BY *Richard L. Gausewitz*

United States Patent Office 3,034,028
Patented May 8, 1962

3,034,028
FREQUENCY MODULATION SERVOMECHANISM SYSTEM
Robert S. Jamieson, 169 E. 19th St., Costa Mesa, Calif.
Filed Dec. 9, 1958, Ser. No. 779,234
13 Claims. (Cl. 318—28)

This invention relates to a position-control mechanism system and method which depend entirely upon frequency modulation as distinguished from amplitude modulation or control.

In my co-pending patent application Serial No. 779,233, filed December 9, 1958, now Patent No. 2,987,662, for AM–FM Servomechanism System and Method, there is shown and described a servomechanism system which embodies frequency modulation principles. However, such system also makes use of amplitude modulation or control in that the amplitudes of two voltages are compared and the resultant voltage or error signal is employed to modulate a frequency. Furthermore, the most simple form of such system is not a true position control since shaft position may not be controlled at or near standstill but only when rotating at a substantial speed. The present system, on the other hand, is a position control system which makes use of two variable frequency oscillators in combination with means for directly taking the difference between two frequencies and employing the differential frequency to control an output member. Stated otherwise, in the present system the input signal is a first variable frequency and the feedback signal is a separate variable frequency proportional to a characteristic (such as the position) of the output member. The input and feedback signals are compared to produce an error signal which controls the position or other characteristic of the output member.

With relation to prior-art servomechanism systems, it is to be understood that there exists a distinct need for a remote-operated position control which is extremely accurate, with little or no residual error. For example, where input and output shafts are to be correlated in position, there exist applications in which it is necessary to effect such correlation not merely in degrees and minutes but in seconds or less. It is pointed out that such extremely precise control may not be effected by conventional position control systems, particularly when the input is disposed at a very substantial distance from the controlled member. For example, let it be assumed that the input member is disposed several miles from the output member and that transmission lines are connected therebetween, the system being of the conventional type in which variations in amplitude of a voltage are employed to control the output member. In such a system, stray or induced voltages, line losses, etc., are so substantial that it is impossible to achieve the above-mentioned degree of accuracy. The above accuracy or precision may not be achieved when the input member is located even more remotely from the output member, and transmission is by electromagnetic means. These factors do not apply, however, when the control is effected solely by means of frequency variation as distinguished from amplitude variation.

In view of the above and other factors characteristic of position-control servomechanism systems, it is an object of the present invention to provide a system and method which operate solely as a result of frequency variations as distinguished from amplitude variations, and which are adapted to effect extremely precise control of an output member even from a great distance.

A further object is to provide a gearless servomechanism, whereby backlash and deadband errors are eliminated.

A further object is to provide a position-control servomechanism system having relatively few parts, and which is adapted not only to effect position control between input and output members but also to effect the locking or slaving of remotely positioned oscillators relative to each other.

A further object is to provide a servomechanism in which variable frequency oscillators are incorporated in both the forward and feedback paths, such oscillators being directly associated with transducers adapted to vary the oscillator frequencies and to generate an error signal comprising the difference between two frequencies, speeds, or instantaneous shaft positions.

A further object is to provide a highly accurate position control system embodying a differential motor.

These and other objects and advantages of the invention will be more fully set forth in the following specification and claims, considered in connected with the attached drawing wherein an embodiment of the invention is illustrated diagrammatically.

Referring to the drawing, input and output transducers 10 and 11 are directly associated, respectively, with forward and feedback oscillators 12 and 13 in order to effect direct variation in the respective oscillator frequencies. In the illustrated form, transducers 10 and 11 are associated with input and output shafts 14 and 15, respectively, in order that the respective oscillator frequencies will be functions of shaft positions. Thus, the transducers 10 and 11 are shaft position transducers in the illustrated form, although it is to be understood that acceleration, speed, signal frequency, etc., may also be involved.

In the illustrated form, transducers 10 and 11 are variable reactance or resistive elements, illustrated as variable air-dielectric capacitors, which are connected through leads 16 and 17, respectively, across the resonant circuits of oscillators 12 and 13 which may be of the Hartley or other suitable type. Thus, variation in the shaft position, with consequent variation in capacitance values, alters the resonant frequencies of the respective tank circuits and thereby alters the frequencies of the oscillators.

The outputs of the respective oscillators 12 and 13 are fed into a differential apparatus 18 adapted to make a direct comparison between the oscillator frequencies. When the oscillator frequencies are different, the differential or error frequency is fed from the differential apparatus 18 to output shaft 15 to cause shaft 15 to rotate in a direction adapted to eliminate the error. Stated more definitely, differential apparatus 18 comprises a compound motor having a common housing 19 which is fixedly mounted in any suitable manner. A first rotor 21 is journalled in housing 19 by means of bearings 22, and has a shaft 23 which is rigidly connected to a cantilevered interior housing 24. A second rotor 26 is journalled in the cantilevered interior housing 24 by means of bearings 27. The shaft 28 of the second rotor 26 is connected through a coupling 29 to the output shaft 15.

A first winding 31 is mounted in housing 19 around the first rotor 21, and a second winding 32 (having the same number of poles as winding 31) is mounted in the interior cantilevered housing 24 around the second rotor 26. The motors 21—31 and 26—32 may each be of the high-hysteresis synchronous type, the rotors 21 and 26 being formed of a high-hysteresis material. In the illustrated form, each of the windings 31 and 32 has two phases wound in a conventional manner. The windings and rotors are so associated that motor 26—32 rotates in the opposite direction from motor 21—31. It follows that when the frequencies fed into windings 31 and 32 are identical, the shafts 28 and 15 will stand still. However, this is not true unless the motors have the same number of poles.

The circuit means for feeding the output of forward oscillator 12 into the winding 31 comprises leads 33 connected to the input of a suitable power amplifier 34. The output of amplifier 34 is fed through leads 36 and 37 to one of the phases of the winding 31. The other phase of winding 31 is connected between lead 37 and a lead 38, the latter extending to lead 36 and having a capacitor 39 interposed therein. Capacitor 39 operates to shift the phase of the current fed into the last-mentioned phase of winding 31.

The circuit means for connecting the feedback oscillator 13 to winding 32 comprises leads 41 connected between the output of oscillator 13 and a suitable power amplifier 42. The output of amplifier 42 is fed through leads 43 and 44 to brushes 45 and 46, respectively, which ride on slip rings 47 and 48 on shaft 23. Slip rings 47 and 48 are connected through leads, not shown, across one of the phases of winding 32. The other phase of winding 32 is suitably connected between slip ring 48 and an additional slip ring 49, the latter being associated through a brush 51, a lead 52 and a capacitor 53 with lead 43. Windings 31 and 32 are therefore similarly connected to their associated amplifiers 34 and 42, respectively. However, the phase relationship is caused to be such that the rotation direction will be opposite, as previously stated.

It is to be understood that both of the oscillators 12 and 13 are adapted to operate in the same frequency range. Both oscillators should be separately and suitably compensated for voltage and temperature drifts. It is also to be understood that the capacitors 10 and 11, or other transducers, should be so constructed that the identical changes in the positions of shafts 14 and 15 produce identical frequency changes in the oscillators 12 and 13, respectively. Thus, for example, the capacitors 10 and 11 may be absolutely identical, and the oscillators 12 and 13 may be likewise identical. Such systems have been built in which the deviation between the position of shaft 15 and that of shaft 14 is six seconds or less. In normal constructions, the system only operates within a 180 degree range where simple capacitors are employed. However, with other transducers or by the use of gears, etc., a system may be adapted to operate through a number of revolutions.

The forward path of the servomechanism system may be defined as comprising transducer 10, oscillator 12, amplifier 34, motor 21—31, shaft 23, motor 26—32, and shafts 28 and 15, the latter being in transducer 11. The feedback path, on the other hand, extends from transducer 11 through leads 17 to oscillator 13, amplifier 42, and leads 43 and 44 back to the brushes for the winding 32.

Operation

To summarize the operation of the position-control servomechanism system, let it first be assumed that the positions of input shaft 14 and output shaft 15 correspond exactly. The frequencies of oscillators 12 and 13 will then be identical, causing rotor 21 to rotate in one direction relative to its winding or stator 31 at the same speed that the second rotor 26 rotates in the opposite direction relative to its winding or stator 32. This is accomplished by proper phasing of the motor windings. However, since stator 32 is directly driven by rotor 21 through shaft 23, the resultant speed of the shaft 28 and the connected output shaft 15 will be zero.

It will next be assumed that the input shaft 14 is turned through a predetermined angle, such as by means of a handle or knob 54 mounted thereon. Assuming that the direction of turning of input shaft 14 is such as to increase the frequency of oscillator 12, this will effect a corresponding increase in the speed of rotation of the rotor 21. The resulting increase in the speed of rotation of the cantilevered housing 24 and the winding 32 causes rotation of rotor 26, thereby varying the setting of the capacitor or other transducer 11. Such variation in the capacitor setting effects alteration in the frequency of feedback oscillator 13 until the frequency thereof is increased to the same frequency as that of oscillator 12. The capacitors and oscillators being identical, it follows that output shaft 15 turns through the same angle as input shaft 14. The converse of this operation applies where the input shaft 14 is turned in the opposite direction to effect a lowering in the frequency of oscillator 12.

It is emphasized that the system not only effects extremely precise position control between input and output shafts 14 and 15, but also causes the oscillators 12 and 13 to operate at identical frequencies, with 13 being the slave of 12.

The system may be employed in a wide number of uses both to effect synchronization of two remotely-positioned oscillators and to effect position control between remotely-positioned shafts, with a high degree of accuracy. There is no residual error, since the components of apparatus 18 are in constant motion relative to each other.

One use of the system is to control a generator in such manner as to effect switching thereof into the line in proper phase and frequency relationship. This may be accomplished by merely adding a set of contacts on the output shaft 15. For such an application salient pole synchronous motors are preferred.

Throughout this specification and claims, the terms "difference in frequencies," etc., are intended to include difference in mechanical speeds, such as in motor 18. Thus, the error signal may be regarded as mechanical instead of electrical.

It is to be understood that the input and output elements may be functionally related for operations in manners other than identical. Thus, for example, the desired functional relationship may be sine, cosine, etc. This may be accomplished by causing the transducers and oscillators to correspond for sine, cosine, etc., operation instead of identical operation.

Various embodiments of the present invention, in addition to what has been illustrated and described in detail, may be employed without departing from the scope of the accompanying claims.

I claim:

1. A position-control servomechanism for controlling the position of an output member in response to a variable input frequency, comprising means to generate a seprate variable frequency which is a function of the position only of said output member, and means to compare directly said variable frequencies and control the position of said output member in accordance with the result of said comparison.

2. A position-control servomechanism system, comprising a differential apparatus adapted to take the difference between two frequencies and translate such difference into the position of an output member, means to feed a control frequency into said differential apparatus, a variable frequency oscillator, means to feed the output from said oscillator into said differential apparatus to thereby effect a comparison between said control frequency and the oscillator frequency, and transducer means associated with said output member for controlling the frequency of said oscillator solely in response to the position of said output member.

3. The invention as claimed in claim 2, in which said transducer means is directly connected to the frequency-determining portion of said oscillator.

4. A servomechanism system, comprising a variable-frequency forward oscillator, input transducer means responsive to the position of an input member to vary the frequency of said oscillator, a variable-frequency feedback oscillator, output transducer means responsive to the position of an output member to vary the frequency of said feedback oscillator, differential means connected to said output transducer means to vary the position thereof in response to the difference between two frequencies supplied to said differential means, and means to supply signals from said forward and feedback oscillators to said differential means.

5. The invention as claimed in claim 4, in which said input and output transducer means and their associated forward and feedback oscillators are functionally related in such manner that predetermined changes in the positions of said input and output members effect related variations in the frequencies of said oscillators.

6. The invention as claimed in claim 4, in which said differential means comprises a compound synchronous motor system having components which rotate in opposite directions.

7. The invention as claimed in claim 4, in which said input and output transducers are corresponding variable capacitors, and said forward and feedback oscillators are of the resonant circuit type in which the oscillator frequencies may be varied by varying said capacitors.

8. A servomechanism system, comprising first and second variable frequency oscillators, means to subtract the frequencies of said oscillators to provide an error signal consisting of the difference between said frequencies, and means responsive to said error signal to position an output member and to effect the sole control of the frequency of one of said oscillators.

9. The invention as claimed in claim 8, in which said error signal is mechanical.

10. A position-control servomechanism system; comprising differential synchronous motor means including a first winding and a first rotor associated therewith, a second winding connected to said first rotor for rotation therewith, a second rotor associated with said second winding for rotation thereby, said second winding being adapted to drive said second rotor in a direction opposite to the direction of rotation of said second winding by said first rotor whereby said second rotor is stationary when identical frequencies are supplied to said first and second windings; an output shaft connected to said second rotor; an output position transducer associated with said output shaft; a variable-frequency oscillator associated with said transducer whereby the frequency of said oscillator is controlled by said transducer and thus by the position of said output shaft; circuit means to feed the output from said oscillator to said second winding; a second variable-frequency oscillator; and means to feed the signal from said second oscillator to said first winding.

11. The invention as claimed in claim 10, in which an input position transducer is connected to said second oscillator for response to the position of an input shaft, said input and output transducers, and said first-mentioned and second oscillators, being correlated to each other whereby corresponding changes in the positions of said input and output shafts effect corresponding variations in the frequencies of said oscillators.

12. The invention as claimed in claim 11, in which said input and output transducers are identical variable capacitors, and said oscillators are of identical construction and have their frequency-determining networks associated with said capacitors for frequency control thereby.

13. A servomechanism system adapted to operate with extreme precision despite the intervention of long distances between the input and output components thereof, comprising a first oscillator, control means to supply input information to said first oscillator to vary the frequency thereof in accordance with said input information, a second oscillator adapted to be disposed remote from said first oscillator, mechanical output means, means responsive to the position of said mechanical output means to control the frequency of said second oscillator in accordance with said position, and means responsive to the frequency only of said first oscillator and the frequency only of said second oscillator to compare said frequencies and effect positioning of said output means in accordance with the result of said comparison.

References Cited in the file of this patent

UNITED STATES PATENTS

| | | |
|---|---|---|
| 2,501,583 | Shafer | Mar. 21, 1950 |
| 2,812,928 | Mesh et al. | Nov. 12, 1957 |
| 2,885,625 | Pittman | May 5, 1959 |

FOREIGN PATENTS

| | | |
|---|---|---|
| 880,317 | Germany | June 22, 1953 |